United States Patent
Lee et al.

(10) Patent No.: US 10,467,498 B2
(45) Date of Patent: Nov. 5, 2019

(54) METHOD AND DEVICE FOR CAPTURING IMAGES USING IMAGE TEMPLATES

(71) Applicants: Matthew Lee, San Jose, CA (US); Mark Lee, San Jose, CA (US); Daniel Lee, San Jose, CA (US)

(72) Inventors: Matthew Lee, San Jose, CA (US); Mark Lee, San Jose, CA (US); Daniel Lee, San Jose, CA (US)

( * ) Notice: Subject to any disclaimer, the term of this patent is extended or adjusted under 35 U.S.C. 154(b) by 128 days.

(21) Appl. No.: 15/556,075

(22) PCT Filed: Mar. 4, 2016

(86) PCT No.: PCT/US2016/020998
§ 371 (c)(1),
(2) Date: Sep. 6, 2017

(87) PCT Pub. No.: WO2016/144800
PCT Pub. Date: Sep. 15, 2016

(65) Prior Publication Data
US 2018/0060690 A1    Mar. 1, 2018

Related U.S. Application Data

(60) Provisional application No. 62/129,631, filed on Mar. 6, 2015.

(51) Int. Cl.
*G06K 9/00* (2006.01)
*H04N 5/225* (2006.01)
(Continued)

(52) U.S. Cl.
CPC ....... *G06K 9/6202* (2013.01); *H04N 5/23222* (2013.01); *H04N 5/23229* (2013.01); *H04N 5/265* (2013.01); *G06K 9/00268* (2013.01)

(58) Field of Classification Search
USPC ....... 382/100, 103, 106, 129, 168, 173, 181, 382/189, 190, 199, 209, 219, 224, 232,
(Continued)

(56) References Cited

U.S. PATENT DOCUMENTS 8,165,352 B1    4/2012  Mohanty et al.
2004/0002894 A1  1/2004  Kocher
(Continued)

OTHER PUBLICATIONS

Lee, Matthew, International Search Report and Written Opinion, PCT/US2016/020998, dated Jul. 11, 2016, 10 pgs.
(Continued)

*Primary Examiner* — Seyed H Azarian
(74) *Attorney, Agent, or Firm* — Morgan, Lewis & Bockius LLP

(57) ABSTRACT

Method and device for capturing images of a target object using image templates at a device are disclosed. The method includes rendering an image template on the display for determining a position of the target object in an image to be captured using the device; capturing a first image of the target object using the image sensor and displaying the captured first image on the display while keeping the image template on the display; extracting one or more features associated with the position of the target object from the captured first image; determining whether the one or more features extracted from the captured first image match the image template; and generating an alert signal in accordance with a determination that at least one of the one or more features extracted from the captured first image matches the image template.

11 Claims, 9 Drawing Sheets

(51) Int. Cl.
*G06K 9/62* (2006.01)
*H04N 5/265* (2006.01)
*H04N 5/232* (2006.01)

(58) Field of Classification Search
USPC ....... 382/254, 274, 276, 286–291, 305, 312; 1/1; 348/207.1, 308; 709/203
See application file for complete search history.

(56) References Cited

U.S. PATENT DOCUMENTS

| | | | |
|---|---|---|---|
| 2005/0249381 A1 | 11/2005 | Silvester et al. | |
| 2008/0144899 A1* | 6/2008 | Varma | G06K 9/522 382/129 |
| 2013/0076950 A1* | 3/2013 | Eshraghian | G11C 13/0007 348/308 |
| 2013/0297675 A1* | 11/2013 | Li | G09B 7/02 709/203 |
| 2016/0028999 A1* | 1/2016 | Ptucha | H04N 5/232 348/207.1 |
| 2017/0169593 A1* | 6/2017 | Leigh | G06T 11/60 |

OTHER PUBLICATIONS

Lee, et al., International Search Report and Written Opinion, PCT/US2016/020998, dated Jul. 11, 2016, 10 pgs.
Lee, et al., International Preliminary Report on Patentability, PCT/US2016/020998, dated Sep. 12, 2017, 8 pgs.

\* cited by examiner

Image Template 200

Image Template 240

Image Template 260

METHOD AND DEVICE FOR CAPTURING IMAGES USING IMAGE TEMPLATES

CROSS REFERENCE TO RELATED APPLICATIONS

This Application is a United States National Stage Application filed under 35 U.S.C. § 371 of PCT Patent Application Serial No. PCT/US2016/020998 filed on Mar. 4, 2016, which claims the benefit of and priority to U.S. Provisional Patent Application No. 62/129,631 filed on Mar. 6, 2015, which is hereby incorporated by reference in its entirety.

TECHNICAL FIELD

The disclosed implementations relate to the field of capturing images, and in particular, to system and method for capturing images of an object using image templates in accordance with a predefined orientation.

BACKGROUND

In general, using electronic devices with image sensors, such as a camera, to capture images in real life requires the photographer to balance many factors such as focus, composition, lighting, aperture, shutter speed, sensitivity. Various technological advancements have aided in the field of balancing these factors. For example, auto-focus has greatly alleviated the technical difficulty of using pre-digital manual-focus-only cameras. Zoom-in/out enables a user of the camera to take photos of a target at different resolutions without having to move closer to or farther from the target. Even further, the recent Lytro "light field" camera has enabled the user to forget about focusing at all.

Despite these advancements, for an amateur user other than professional photographers, capturing good photos is still a learned skill that requires hard work and practice. For example, even though the technology for auto-focusing exists, the amateur user may find it challenging to employ such technology effectively to capture professional-grade photos. Similar issues apply to other aspects of photography, such as composition, lighting, aperture, shutter speed, and sensitivity. There are other difficulties involved in capturing high-quality photos. For example, in a gymnastics competition, it is difficult (even with professional equipment) to capture an image in which the gymnast is at the apex of a swing or jump split. In other high-speed sports, the user faces similar problems. Certain medical procedures require that a doctor take photos of a patient from a desired angle before or during a procedure, which often takes a lot of trainings.

SUMMARY

The implementations of the present disclosure provide device and method for capturing images.

In accordance with some implementations of the present application, a method for capturing images of a target object using image templates is performed at a device having one or more processors, memory, an image sensor, and a display. The method includes rendering an image template on the display for determining a position of the target object in an image to be captured using the device; capturing a first image of the target object using the image sensor and displaying the captured first image on the display while keeping the image template on the display; extracting one or more features associated with the position of the target object from the captured first image; determining whether the one or more features extracted from the captured first image match the image template; and generating an alert signal in accordance with a determination that at least one of the one or more features extracted from the captured first image matches the image template.

In another aspect, a device (e.g., device 100, FIG. 1) includes an image sensor, a display, one or more processors, and memory storing one or more programs for execution by the one or more processors. The one or more programs include instructions for performing, or controlling performance of, the operations of any of the methods described herein.

In another aspect, a non-transitory computer readable storage medium storing one or more programs, the one or more programs comprising instructions, which, when executed by a computer system with one or more processors, cause the computer system to perform, or control performance of, the operations of any of the methods described herein.

In yet another aspect, a computer system includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosure as well as additional features and advantages thereof will be more clearly understood hereinafter as a result of a detailed description of preferred implementations when taken in conjunction with the drawings.

To illustrate the technical solutions according to the implementations of the present application more clearly, the accompanying drawings for describing the implementations are introduced briefly in the following. The accompanying drawings in the following description are only some implementations of the present application; persons skilled in the art may obtain other drawings according to the accompanying drawings without paying any creative effort.

Like reference numerals refer to corresponding parts throughout the several views of the drawings.

DESCRIPTION OF EMBODIMENTS

Reference will now be made in detail to implementations, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the implementations.

The following clearly and completely describes the technical solutions in the implementations of the present application with reference to the accompanying drawings in the implementations of the present application. Apparently, the described implementations are merely a part rather than all of the implementations of the present application. All other implementations obtained by persons of ordinary skill in the art based on the implementations of the present application without creative efforts shall fall within the protection scope of the present application.

Figure 1:
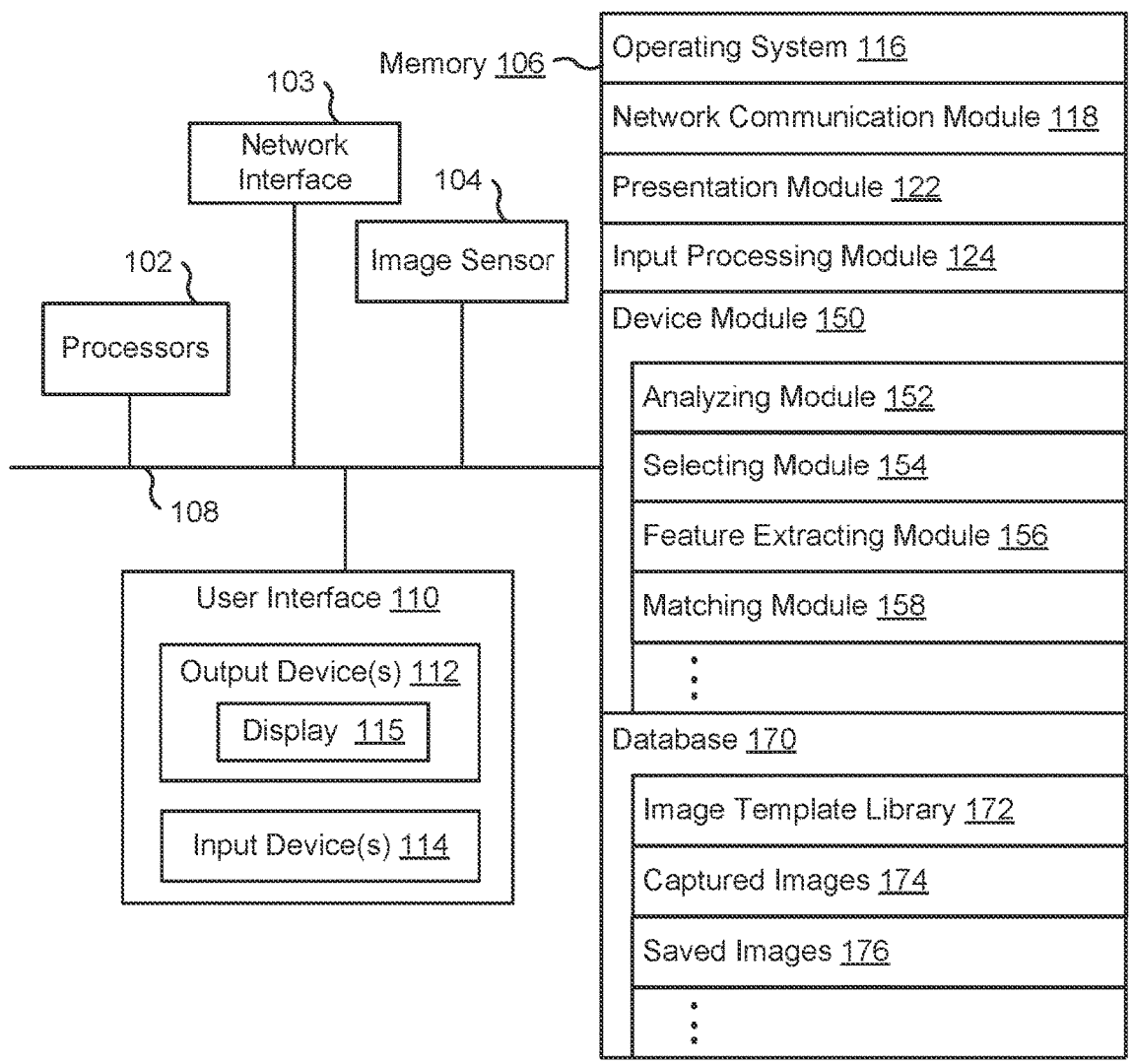
FIG. 1 is a block diagram of a device in accordance with some implementations.

FIG. 1 is a block diagram illustrating an electronic device 100 associated with a user in accordance with some implementations. Examples of device 100 include, but are not limited to a camera, a mobile phone, a smart phone, a handheld computer, a wearable computing device, a personal digital assistant (PDA), a tablet device, or a combination of any two or more of these data processing devices or other suitable data processing devices.

Device 100, typically, includes one or more processors 102, a network interface 103, an image sensor 104, memory 106, a user interface 110, and one or more communication buses 108 for interconnecting these components (sometimes called a chipset). User interface 110 includes one or more output devices 112, such as speaker(s) and/or a visual display 115, which enable presentation of various media content. User interface 110 also includes one or more input devices 114, including user interface components that facilitate user input such as a keyboard, a mouse, a voice-command input unit including a microphone, a touch screen display, a touch-sensitive input pad, a camera, a gesture capturing camera, or other input buttons or controls. In some implementations, the device 100 uses a microphone and voice recognition or a camera and gesture recognition to supplement or replace the keyboard.

As shown in FIG. 1, the device 100 also includes an image sensor 104 for capturing an optical image and saving the optical image in the memory 106 in the form of electronic signals. In some implementations, the image sensor 104 includes a semiconductor charge-coupled (CCD) device, an active pixel sensor in complementary metal-oxide-semiconductor (CMOS) device, an N-type metal-oxide-semiconductor (NMOS) device, or other suitable image sensor devices.

Memory 106 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 106, optionally, includes one or more storage devices remotely located from one or more processors 102. Memory 106, or alternatively the non-volatile memory within memory 106, includes a non-transitory computer readable storage medium. In some implementations, memory 106, or the non-transitory computer readable storage medium of memory 106, stores the following programs, modules, and data structures, or a subset or superset thereof:

- operating system 116 including procedures for handling various system services and for performing hardware dependent tasks;
- network communication module 118 for connecting device 100 to other computing devices in one or more networks via one or more network interfaces 103 (wired or wireless);
- presentation module 122 for enabling presentation of information (e.g., a captured image) at device 100 via one or more output devices 112 (e.g., display 115) associated with user interface 110;
- input processing module 124 for detecting one or more user inputs or interactions from one of the input devices 114 (e.g., a camera or a touchscreen) and interpreting the detected input or interaction;
- device module 150, which provides data processing and functionalities for device 100, including but not limited to:
  - analyzing module 152 for analyzing reference images to extract one or more parameters associated with positions (including orientations) of one or more objects in the reference images (note that the reference images may or may not be captured by the device 100);
  - selecting module 154 for automatically selecting an image template based on information associated with a target object captured by the device 100 or the user input through the input devices 114;
  - feature extracting module 156 for extracting one or more predefined features of the target object in an captured image; and
  - matching module 158 for determining whether the one or more extracted features of the captured image match the image template;
- database 170 for storing various images, including, but not limited to:
  - image template library 172 for storing image templates derived from the references images or other sources;
  - captured images 174 for storing images captured by the image sensor when the device is pointing at the target object in the captured images; in some implementations, a captured image is saved in a cache of the device 100 for a short period of time before it is replaced by the next one captured by the image sensor (note that a captured image is one candidate image of the image of the target object from particular angle before the user presses the shutter button of the device 100); and
  - saved images 176 for saving the captured image that matches a selected image template and thus is determined as the final image of the target object.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 106, optionally, stores a subset of the modules and data structures identified above. Furthermore, memory 106, optionally, stores additional modules and data structures not described above.

In some implementations, the device 100 may exchange image data with one or more other devices, and/or a system server using any suitable network(s). Examples of the networks include local area networks (LAN) and wide area networks (WAN) such as the Internet. Optionally, the networks are implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

FIGS. 2A-2E illustrate exemplary user interfaces for providing an image template displayed on the device 100, and the image template is then compared with a captured image of a target object in accordance with some implementations. One skilled in the art will appreciate that the user interfaces shown in FIGS. 2A-2E may be implemented on other similar computing devices. The user interfaces in FIGS. 2A-2E are used to illustrate the processes described herein, including the processes described with respect to FIGS. 3A-3C.

Figure 2A:
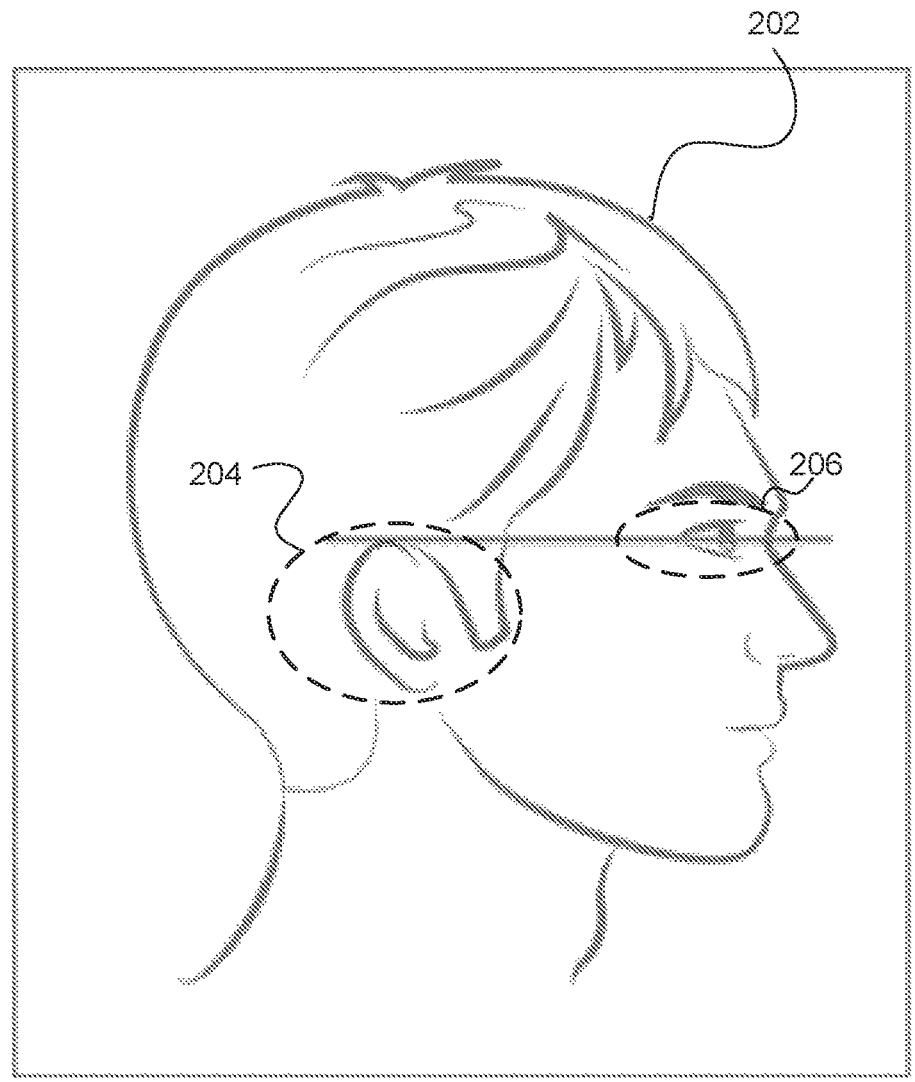
FIGS. 2A through 2E illustrate exemplary user interfaces for providing an image template displayed on the device for capturing images of a target object in accordance with some implementations.

FIG. 2A shows an image template 200 including one or more parameters of a side view of a human facial portrait. In some implementations, the image template 200 is used by a dentist or his/her assistant for taking pictures of a dental patient—from different standard angles—in order to collect information about the patient's facial characteristics before performing any further dental treatment. In some implementations, the image template 200 is created from one or more reference images of side-view facial portraits. The reference images may be analyzed, e.g., using analyzing module 152 of the device 100 (FIG. 1), to extracted one or more parameters. As shown in FIG. 2A, the extracted parameters of the image template 200 include a contour 202 outlining the boundary of the side-view portrait, which is used for defining the position of the target object in a captured image. The extracted parameters of the image template 200 also include one or more regions, such as the ear region 204, and the eye region 206. The contour 202, the ear region 204, and/or the eye region 206 of the image template 200, collectively, are used for positioning the target object in a captured image 220, as shown in FIG. 2B.

Figure 2B:
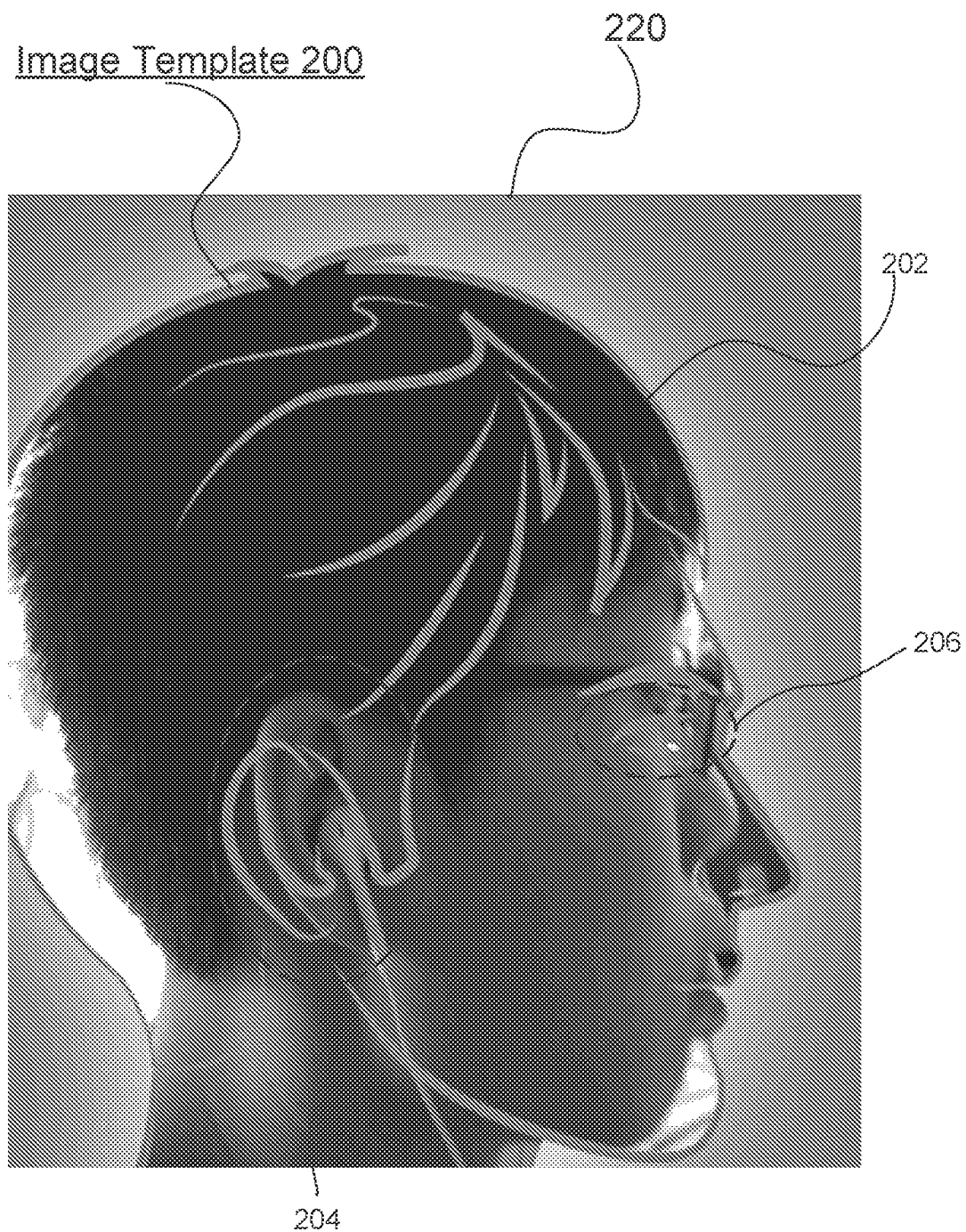

In FIG. 2B, while displaying the image template 200 on the user interface, the device 100 (or more specifically, the image sensor) captures an image 220 of a target object (e.g., a dental patient). In some implementations, the device 100 (e.g., the feature extracting module 156 of device 100, FIG. 1) processes the captured image 220 to extract one or more features of the target object in the captured image 220. For example, a contour of the target object in the captured image, or one or more regions of the target object are extracted from the captured image. The device 100 (e.g., the matching module 158 of device 100, FIG. 1) then performs a matching process between the image template 200 and the processed captured image 220. As shown in FIG. 2B, the matching process determines whether the contour 202 of the image template 200 match the contour of the face structure in the captured image 220. In some implementations, the matching process also determines whether other regions, such as the ear region 204, and/or the eye region 206 match the corresponding regions of the target object in the captured image 220. Various image feature extraction and comparison technologies are used for matching the one or more parameters of the image template with the captured image. These technologies include, but are not limited to, pixel-based check based on the color value of the pixels of the desired regions; block-based check based on the average color value of the partitioned and selected blocks; histogram check; and other available image recognition and comparison technologies.

Figure 2C:
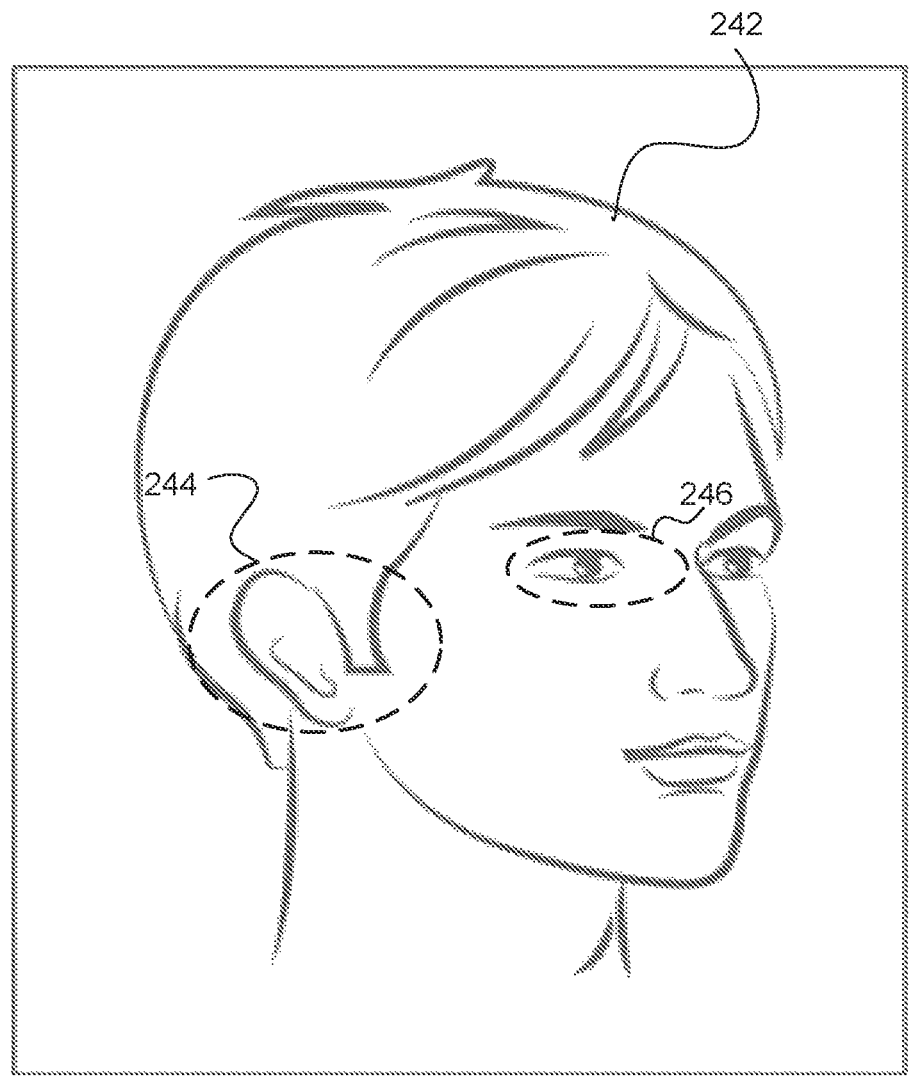

FIG. 2C shows an image template 240 of a human facial portrait facing a different angle from the image template 200 of FIG. 2A. As shown in FIG. 2C, one or more parameters are extracted from the image template 240, the one or more parameters including a contour 242, an ear region 244, and an eye region 246. As described above in connection with FIGS. 2A and 2B, the matching process may determine whether the contour, the ear region, and/or the eye region of the captured image match the contour 242, the ear region 244, and/or the eye region 246 of the image template 240 when the image template is used for taking photos of a target object.

Figure 2D:
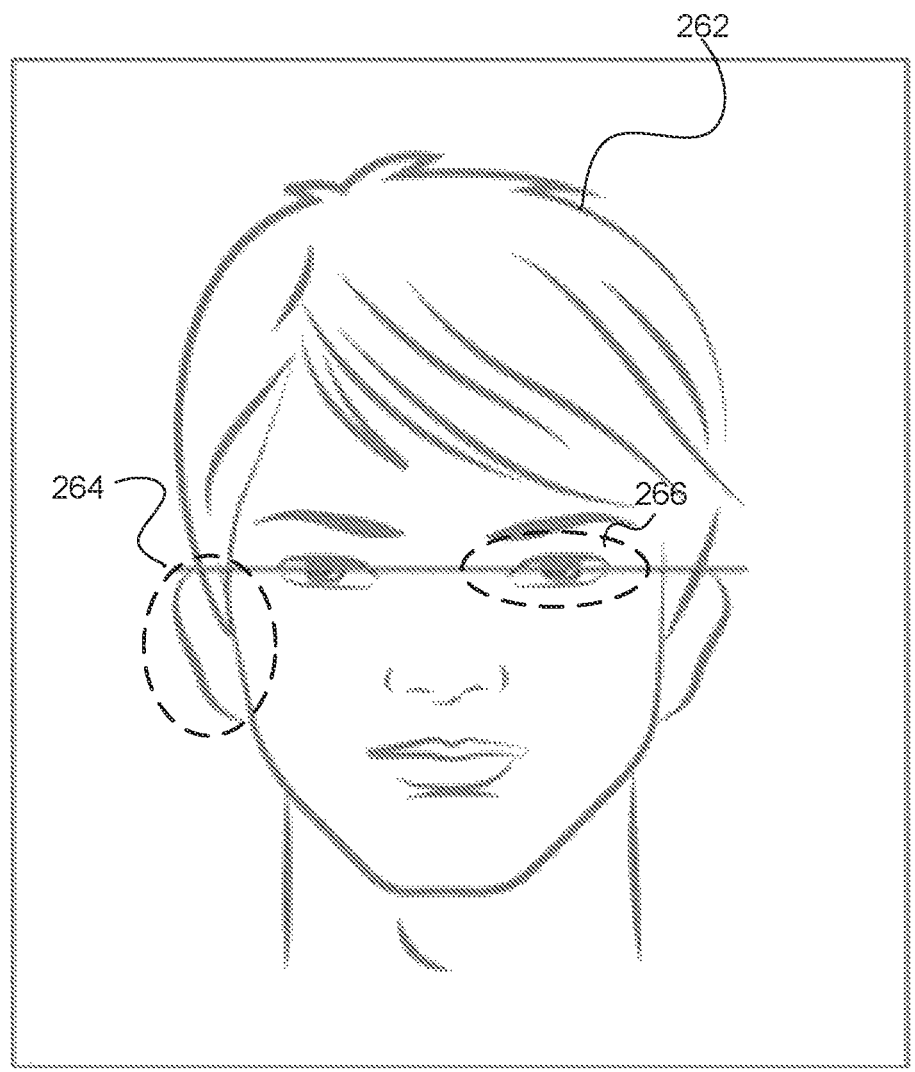

FIG. 2D shows an image template 260 of a human facial portrait in a front view. As shown in FIG. 2D, one or more parameters are extracted from the image template 260, the one or more parameters including a contour 262, an ear region 264, and an eye region 246. The contour 262, the ear region 264, and/or the eye region 266 of the image template 260 are used for positing the target object in a captured image 280 of the patient's facial characteristics in a front view, as shown in FIG. 2E.

Figure 2E:
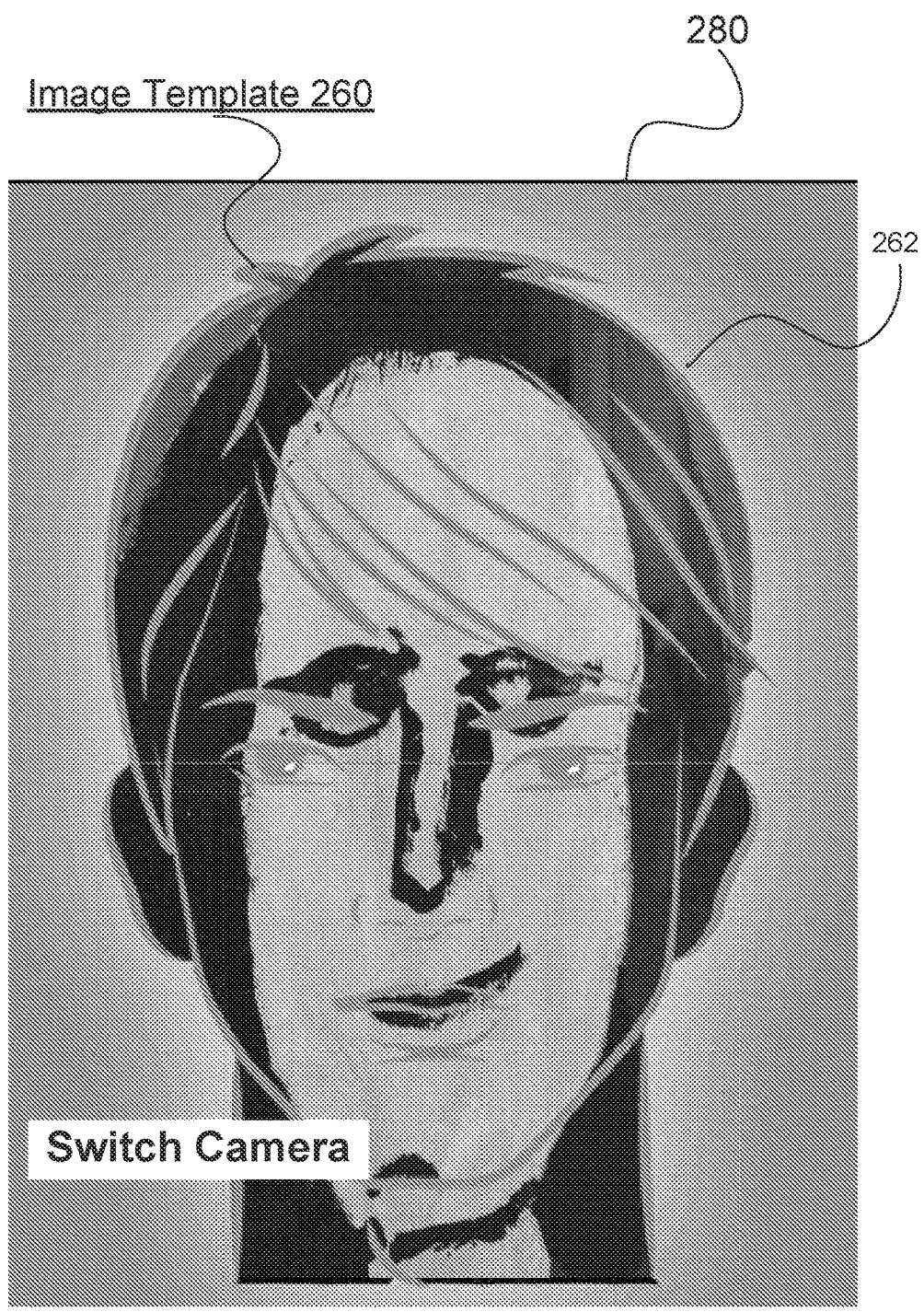

In FIG. 2E, while the image template 260 is displayed on the user interface, an image 280 is captured using the image sensor 104 of the device 100. In some implementations, the device 100 (e.g., the feature extracting module 156 of device 100, FIG. 1) processes the captured image 280 to extract one or more features of the target object in the captured image 280. For example, a contour of the target object in the captured image, or one or more regions of the target object are extracted from the captured image. In some implementations, the device 100 (e.g., the matching module 158 of device 100, FIG. 1) performs a matching process between the image template 260 and the processed captured image 280. As shown in FIG. 2E, the matching process determines whether the contour 262 of the image template 260 match the contour of the target object in the captured image 280. In some implementations, the matching process also determines whether other regions match the corresponding regions of the target object in the captured image 280.

Figure 3A:
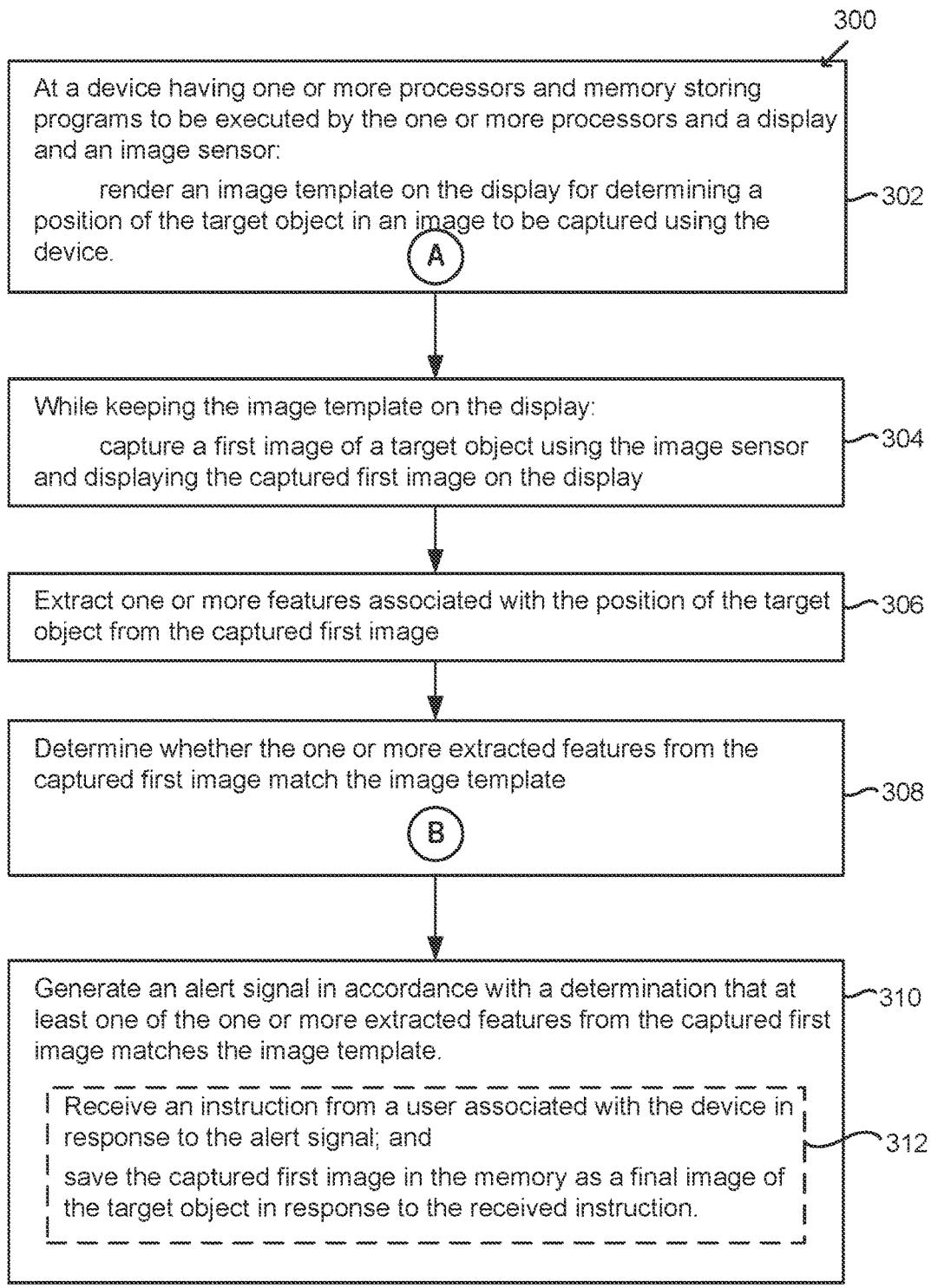
FIGS. 3A through 3C illustrate a flowchart diagram of a method for capturing images in accordance with some implementations.
Figure 3B:
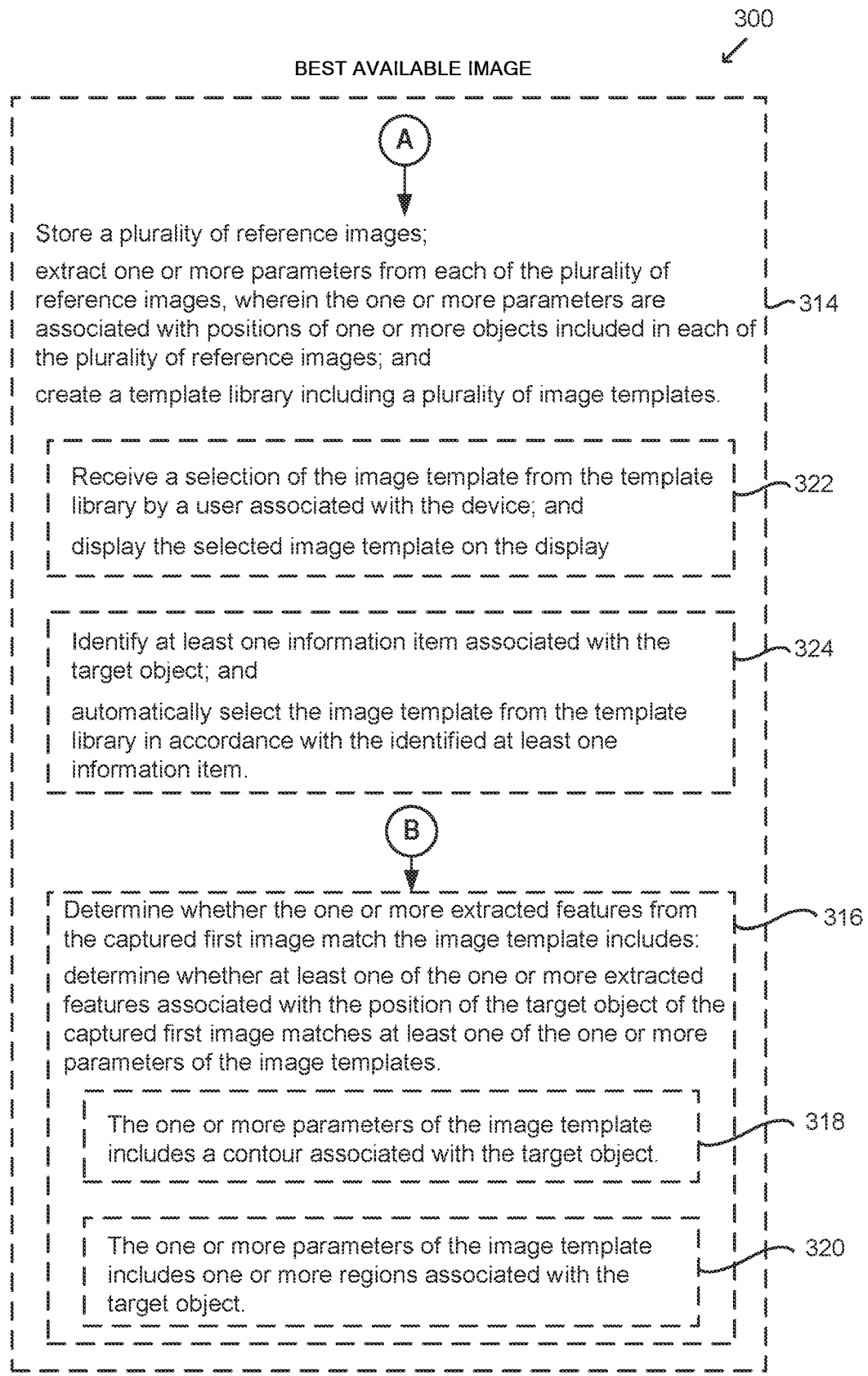
Figure 3C:
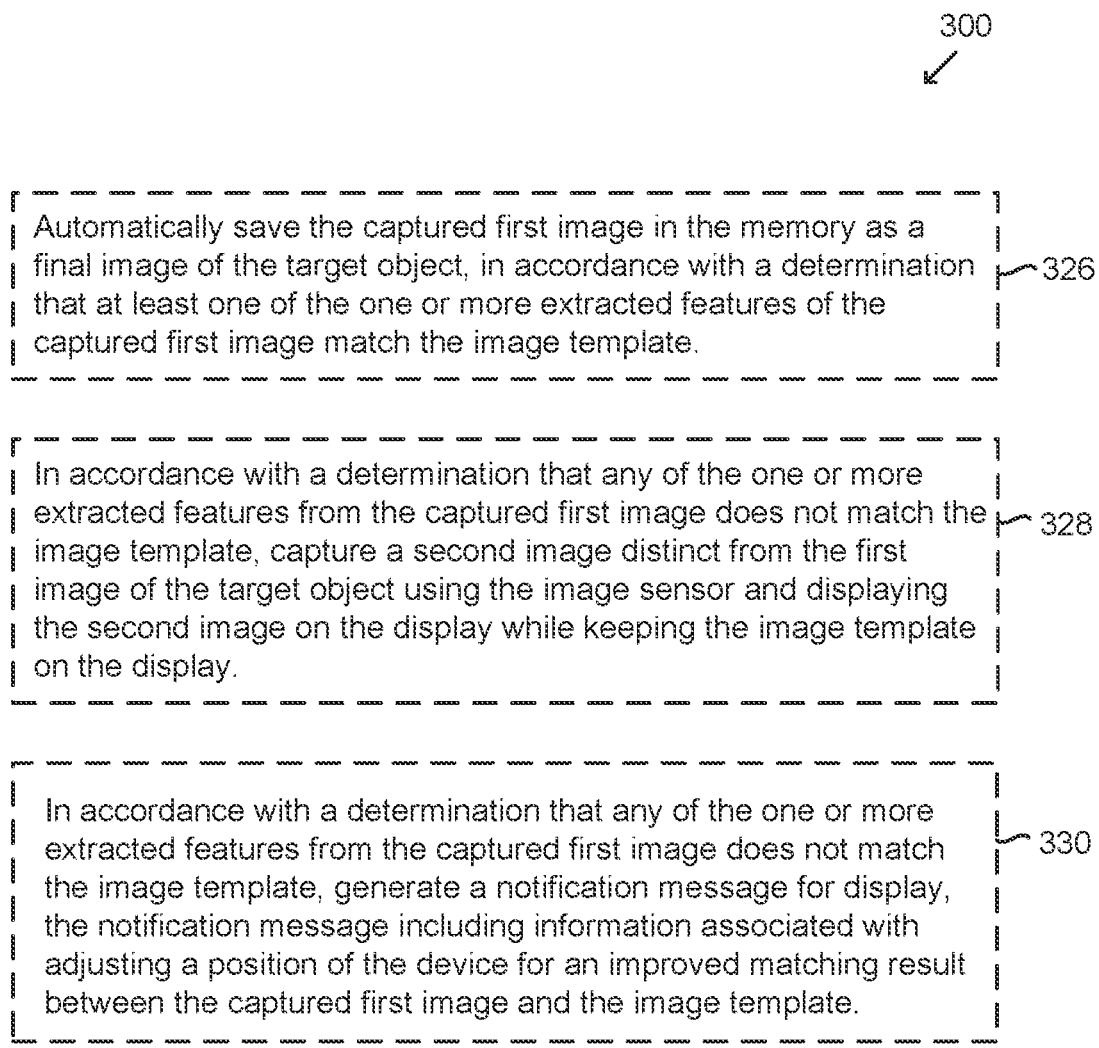

FIGS. 3A-3C illustrate a flowchart of a method 300 for capturing images using image templates according to an embodiment of the present disclosure. In some implementations, the method 300 is performed by a device with one or more processors, a display, an image sensor, and memory. For example, in some implementations, the method 300 is performed by the device 100 (FIG. 1) or a component thereof (e.g., device module 150, FIG. 1). In some implementations, the method 300 is governed by instructions that are stored in a non-transitory computer readable storage medium and the instructions are executed by one or more processors of the device. Optional operations are indicated by dashed lines (e.g., boxes with dashed-line borders).

As shown in FIG. 3A, the method 300 includes, at a device having one or more processors and memory storing programs to be executed by the one or more processors and a display and an image sensor, rendering (302) an image template on the display for determining a position (including orientation) of a target object (e.g., a dental patient) in an image to be captured using the device. In some implementations, the image template is overlaid in the viewfinder of the device.

In some implementations, the method 300 further comprises storing (314) a plurality of storing a plurality of reference images in the memory, the plurality of reference images including one or more professional photos, or reference images created by the user using a software application. The reference images for creating the image templates include, but are not limited to: orthodontics masks, professional photographers, previously taken photos selected by the user, or software-composed images. The reference images of various subjects, such as portraits, landscapes, sports, wildlife, are used on a wide range of applications. For example, the orthodontics masks are used for outlining the ideal position for taking photos of the patient's teeth. In some examples, the pictures taken previously by the user, and/or the professional pictures downloaded by the user are related to a tourism spot, and these reference images include the user's desired composition of the photos. For example, these reference images include a desired composition, and/or background (such as no pedestrians in the scene, or a flock of birds flying in the background sky). In some examples, the reference images may also include athletic training motion photos, professional portraits headshots, or other suitable images.

In accordance with the stored reference images, the method 300 also includes extracting (314) one or more parameters from each of the plurality of reference images by the device (e.g., the analyzing module 152 of the device 100, FIG. 1). The extracted parameters are associated with positions (including orientations) of one or more objects included in each of the plurality of reference images. In some implementations, the one or more parameters extracted from the reference images are used for determining whether the captured image matches the one or more extracted parameters of the image template. For example, the one or more parameters include predefined contours of the target object in the reference images, or selected regions of the target object in the reference images. In some implementations, the one or more parameters are associated with one or more of the positions of the objects relative to the background in the captured image, trajectory angle of shooting, relative sizes and shapes of objects, lighting, focus, shutter speed, sensitivity, and aperture.

In some implementations, for a reference image, the analyzing module 152 analyzes information about the reference image, e.g. the positions of objects, the relative sizes and shapes of objects, and the lighting of the environment. The analyzing module 152 also analyzes the image's metadata, e.g. shutter speed, sensitivity, and aperture. These pieces of information make up the "feature data" of the reference images, some or all of which become the parameters of the image templates. Every reference image has its feature data analyzed by the analyzing module 152 for converting the reference image into corresponding image template.

As shown in FIG. 3B, in accordance with the extracted parameters from the reference images, the method 300 further includes creating (314) a template library (e.g., image template library 172 of device 100, FIG. 1) including a plurality of image templates. In some implementations, the image templates have various degrees of transparency, so that the image template can be overlaid along with the captured image on the display.

In some implementations, the image template library stores one or more image templates that are used in various environments. Through the user interface, the user selects the image template that is suitable for the current environment. Using orthodontics as an example, a dentist or his/her assistant takes pictures of a dental patient—from different standard angles—in order to collect information about the patient's facial structure. In the present disclosure, the dentist can choose one or more image templates (e.g., image templates 200, 240, and/or 260) for taking facial profile pictures of the patient from various angles. This ensures that the resulting pictures conform much more closely to the desired standard angles (and anatomical landmarks). The captured pictures can then be delivered to an orthodontist who works remotely from where the dentist is located. By doing so, the dental patient can receive more professional and better orthodontic care even if the dentist is not an orthodontic specialist. In another example, tourists often want to take good pictures of themselves in front of iconic landmarks around the world. In some implementations, the tourist may choose an image template of a particular tourist pose in front of a landmark, e.g., the Eiffel tower, and moves the camera around until the captured image matches the image template. In some implementations, the image template is coupled with GPS data from the camera so that the desired image template is pulled out from the image template library and presented to the user based on the current location of the camera.

In some implementations, the user needs an image template that is not found in the image template library, the user may download one or more image templates to be added into the image template library. The user may use suitable software to create new templates from inputted reference images. In some implementations, the software (e.g., the analyzing module 152 of device 100, FIG. 1) analyzes the positions of objects in the desired reference images, and traces outlines around those objects. The lines are converted into a new, customized image template, which is then added to the existing template library.

In some implementations, the reference images are selected from works done by professional photographers, in areas ranging from portraits, landscapes, sports, wildlife, to other fields. These reference images serve as desired photos selected by the user, i.e., pictures that are well-composed, well-focused. The user may import any desired reference images into the device to be converted to image templates and stored in the image template library.

In some implementations, after creating the template library, the method 300 further includes receiving (322) a user selection of the image template from the template library; and displaying (322) the user-selected image template on the display while capturing images using the device. In some implementations, the user directly selects an image template from the template library. After receiving the selection of the template image from the user, the template image overlays in the view finder of the display of the device for outlining a desired position (and maybe orientation) of the target object in the image to be captured.

In some implementations, the method 300 includes identifying (324) at least one information item associated with the target object; and automatically selecting (324) the image template from the image template library in accordance with the identified at least one information item. In some implementations, when the user does not make any selection, the device automatically selects an image template from the template library based on various information items, such as current location information, a test image captured by the device, or the last image captured and saved by the device.

In some implementations, the steps of identifying (324) at least one information item associated with the target object and automatically selecting (324) the image template based on the identified at least one information item include one or more of the following situations: (1) the device identifies location information identified by GPS or network provider data of the device, and the device (e.g., the image template selecting module 154 of the device 100) then selects an image template based on the identified location information; (2) the user uses the device to capture a test image of the target object, and the test image is processed for extracting information items: for example, the information items extracted from the test image include: location information identified by the device and saved as metadata of the test image; identified contour and/or shape of the target object information using suitable image recognition and matching technologies, the device (e.g., the image template selecting module 154 of the device 100) then selects the image template in accordance with the contours of the target object information identified in the test image; and (3) in accordance with the image captured and saved in the memory of the device previously, the device (e.g., the image template selecting module 154 of the device 100) selects an image template from the template library. In some implementations, the automatically selected template image overlays the view finder or the display of the device for outlining a desired position of the target object in the image to be captured.

In some implementations, while keeping the image template on the display (e.g., the image template 200 of FIG. 2A), the method 300 includes capturing (304) a first image of the target object using the image sensor and displaying the captured first image on the display. In some implementations, the image is captured by the image sensor, stored in the cache of the image sensor, and shown on the display. The image is replaced repeatedly by the next one captured by the image sensor until a captured image is determined to be a match of the image template.

In some implementations, after capturing the first image of the target object, the method 300 includes extracting (306) one or more features associated with the position of the target object from the captured first image. In some implementations, the captured image is processed and the features are extracted from the captured image by the device (e.g., the feature extracting module 156 of device 100, FIG. 1). In some implementations, the extracted features include a contour of the target object in the captured image, and/or one or more regions of the target object in the captured image. In some implementations, the extracted features also include one or more of imaging-shooting trajectory angle, relative sizes and shapes of objects, lighting, focus, shutter speed, sensitivity, and aperture.

In some implementations, after extracting the one or more features associated with the position of the target object from the capture image, the device (e.g., the matching module 158 of device 100, FIG. 1) determines (308) whether the one or more features extracted from the captured first image match the image template or a portion therein. In some implementations, the extracted features associated with a position of the target object in the captured image include contour of the target object, and/or one or more regions of the target object. In some implementations, the extracted features are compared with the image template, and a weighted match value is determined. When the weighted match value is above a predetermined threshold of similarity, e.g., no less than a weighted match value of 90% similarity, the captured image is determined to match the image template and the captured image is ready to be saved as the final image of the target object in the device 100. In some implementations, the predetermined threshold of similarity varies in accordance with the view types, for example, a higher threshold is used for a static view corresponding to a static target object, and a lower range is used for a dynamic view corresponding to a moving target object. In some implementations, the device may use various image recognition and comparison technologies for determining whether the one or more features extracted from the captured image match the image template. These technologies include, but are not limited to, pixel-based check based on the color value of the pixels of the desired regions; block-based check based on the average color value of the partitioned and selected blocks; histogram check; and other available image recognition and comparison technologies.

In some implementations, the device (e.g., the matching module 158 of device 100, FIG. 1) determines (316) whether at least one of the one or more extracted features associated with the position of the target object of the captured first image matches at least one of the one or more parameters of the image template. In some implementations, the one or more parameters of the image template include (318) a contour (e.g., contour 202 of image template 200, FIG. 2A) associated with the target object. In some implementations, the one or more parameters of the image template include (320) one or more regions (e.g., ear region 204 and eye region 206 of image template 200, FIG. 2A) associated with the target object.

In some implementations, the matching module 158 searches for a match between the captured image and an image template such that every one of their feature data is sufficiently similar. The captured image and an image template are predetermined to be "sufficiently similar" when they satisfy a certain threshold level of similarity.

In some implementations, in accordance with a determination that at least one of the one or more features extracted from the captured first image matches the image template, the method 300 includes generating (310) an alert signal. The alert signal may be displayed on the display to be viewed by the user or broadcasted by the speaker in the form of an audio signal such as a click sound. In some implementations, the method 300 includes receiving (312) an instruction from a user of the device in response to the alert signal; and saving (312) the captured first image in the memory as a final image of the target object in response to the received instruction.

In some implementations, in accordance with a determination that at least one of the extracted features of the captured first image matches the image template (or a portion of the template), the method 300 includes automatically saving (326) the captured first image in the memory as a final image of the target object.

In some implementations, in accordance with a determination that any of the one or more features extracted from the captured first image does not match the image template, the method 300 further includes capturing (328) a second image distinct from the first image of the target object using the image sensor. While keeping the image template on the display, the device displays (328) the second image on the display.

In some implementations, in accordance with a determination that any of the one or more features extracted from the captured first image does not match the image template, the method 300 includes generating (330) a notification message for display. The notification message includes information of how to adjust a position (including orientation) of the device for an improved matching result between the captured image and the image template. For example, the notification message includes one or more of the weighted matching value (e.g., in percentage %) between the captured first image and the image template. In some implementations, the notification message also includes recommendations to the user for adjusting the device position, such as moving the device to the left, right, up, and/or down, changing the distance, and/or angle between the device and the target object, and/or pointing the device more upwards. The notification message may also include information for recommending the user to adjust optical parameters, e.g., adjusting the focus, and/or slowing the shutter speed, of the device for a better matching result between the captured image and the image template.

In some implementations, when the device is set to automatically save the captured image that matches the image template, the device may automatically adjust the related settings when there is a close match, including both position and/or optical settings, so that the device achieves a match, and subsequently saves the captured image.

Although FIGS. 2A-2E illustrate image templates associated with facial characteristics from different angles, the device and the method for capturing images as illustrated in the present disclosure are applicable to various applications. For example, the present disclosure may be applied in taking studio photos, including wedding photos, professional headshots, high school proms, and/or modeling photos.

The present disclosure is also applicable to shooting dynamic athletic training/performing photos. For example, in order to shoot a photo of a gymnastic split at the apex of the gymnast's jump, an image template including parameters associated with the angle between the legs when the legs form a straight line, i.e., the angle between the legs is 180°, is selected and displayed on the display of the device. The coach/audience then points the device to the gymnast, and the device, according to some implementations of the present disclosure, alerts the coach/audience to take a photo, or automatically takes a photo of the gymnast at the apex of each jump, in accordance with a determination by the device that the split angle between the gymnast's legs in the captured image match the parameters of the image template shown on the display.

In some implementations, the present disclosure may be used in surveillance devices and systems for security purposes, for example, a motion-only camera which starts recording video when there is a match between a predetermined image template and a captured image. For example, an image template includes parameters associated with a certain position of human body are selected, and the device determines whether a captured image matches the image template. In some implementations in order to identify abnormal and suspicious activities nearby the surveillance device, the certain position of human body included in the image template may be predetermined to be a position distinct from normal positions of pedestrians passing by the surveillance device. When a position of a human body captured by the device is recognized to match the certain position of human body (e.g., a suspicious activity) in the image template, the device automatically saves the captured image. In the application of the surveillance systems, the present disclosure may be installed onto the video camera, and pre-set so that if the device recognizes a suspicious activity by recognizing a match between the captured image and the image template, the device starts a video recording to record the recognized suspicious activities.

It should be noted that, in the foregoing processes and structural diagrams, not all the steps and modules are necessary, and some steps or modules may be ignored according to actual needs. An execution sequence of steps is not fixed, and may be adjusted as required. Division of modules is merely functional division for ease of description; in an actual implementation, one module may be implemented by multiple modules, and functions of multiple modules may also be implemented by a same module; and these modules may be located in a same device, and may also be located in different devices.

Hardware modules in the implementations may be implemented in a mechanical or electronic manner. For example, one hardware module may include a specially designed permanent circuit or logical device (for example, a dedicated processor, such as an FPGA or an ASIC), and is used for perform specific operations. The hardware module may also include a programmable logic device or a circuit temporarily configured by software (for example, including a general processor or other programmable processors), and is used for performing specific operations. Whether the hardware module is implemented by using a mechanical manner, or by using a dedicated permanent circuit, or by using a temporarily configured circuit (for example, configured by software) may be determined according to costs and time.

The present disclosure further provides a machine readable storage medium, which stores an instruction enabling a machine to execute the method described in the specification. Specifically, a system or an apparatus equipped with the storage medium may be provided, software program code for implementing a function of any embodiment in the foregoing implementations is stored in the storage medium, and a computer (or a CPU or an MPU) of the system or the apparatus is enabled to read and execute the program code stored in the storage medium. In addition, an operating system operated in a computer may further be enabled, according to the instructions based on the program code, to perform a part of or all of actual operations. The program code read from the storage medium may further be written in a memory disposed in an expansion board inserted in the computer or may be written in a memory disposed in an expansion unit connected to the computer, and then the CPU disposed on the expansion board or the expansion unit is enabled, based on the instruction of the program code, to perform a part of or all of the actual operations, so as to implement the functions of any embodiment in the foregoing implementations.

An embodiment of the storage medium used for providing the program code includes a floppy disk, a hard disk, a magneto-optical disk, an optical disc (such as a CD-ROM, a CD-R, a CD-RW, a DVD-ROM, a DVD-RAM, a DVD-RW, and a DVD+RW), a magnetic tape, a nonvolatile memory card and a ROM. Optionally, a communications network may be used for downloading the program code from a server computer.

The foregoing descriptions are merely preferred implementations of the present application, which are not used for limiting the protection scope of the present application. Any modification, equivalent replacement, and improvement made without departing from the spirit and principle of the present application shall fall within the protection scope of the present application.

While particular implementations are described above, it will be understood it is not intended to limit the application to these particular implementations. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations.

However, the illustrative discussions above are not intended to be exhaustive or to limit the application to the precise forms disclosed. Many modifications and variations are possible in view of the above teachings. The implementations were chosen and described in order to best explain the principles of the application and its practical applications, to thereby enable others skilled in the art to best utilize the application and various implementations with various modifications as are suited to the particular use contemplated.

What is claimed is:

1. A method for capturing images of a target object using image templates, comprising:
   at a device having one or more processors and memory storing programs to be executed by the one or more processors and a display and an image sensor:
      storing a plurality of reference images in the memory;
      generating image templates from the plurality of reference images, each image template including one or more parameters extracted from the plurality of reference images, wherein the one or more parameters are associated with positions of one or more objects included in each of the plurality of reference images and include a contour of the one or more objects;
      rendering, from the image templates, an image template on the display for determining a position of the target object in an image to be captured using the device;
      capturing a first image of the target object using the image sensor and displaying the captured first image on the display while keeping the image template on the display;
      extracting one or more features associated with the position of the target object from the captured first image;
      determining whether the one or more features extracted from the captured first image associated with the position of the target object from the captured first image match the one or more parameters of the image template; and
      generating an alert signal in accordance with a determination that at least one of the one or more features extracted from the captured first image matches the image template.

2. The method of claim 1, wherein the one or more parameters of the image template includes one or more regions associated with the target object.

3. The method of claim 1, further comprising:
   receiving a selection of the image template from the image templates by a user associated with the device; and
   displaying the selected image template on the display.

4. The method of claim 1, further comprising:
   identifying at least one information item associated with the target object; and automatically selecting the image template from the image templates in accordance with the identified at least one information item.

5. The method of claim 1, further comprising:
   receiving an instruction from a user associated with the device in response to the alert signal; and
   saving the captured first image in the memory as a final image of the target object in response to the received instruction.

6. The method of claim 1, further comprising:
   automatically saving the captured first image in the memory as a final image of the target object, in accordance with a determination that at least one of the one or more extracted features of the captured first image match the image template.

7. The method of claim 1, further comprising:
   in accordance with a determination that any of the one or more features extracted from the captured first image does not match the image template, capturing a second image distinct from the first image of the target object using the image sensor, and while keeping the image template on the display, displaying the second image on the display.

8. The method of claim 1, further comprising:
   in accordance with a determination that any of the one or more features extracted from the captured first image does not match the image template, generating a notification message for display, the notification message including information associated with adjusting a position of the device for an improved matching result between the captured first image and the image template.

9. A device, comprising:
   a display;
   an image sensor;
   one or more processors; and
   memory storing one or more programs to be executed by the one or more processors, the one or more programs comprising instructions for:
      storing a plurality of reference images in the memory;
      generating image templates from the plurality of reference images, each image template including one or more parameters extracted from the plurality of reference images, wherein the one or more parameters are associated with positions of one or more objects included in each of the plurality of reference images and include a contour of the one or more objects;
      rendering, from the image templates, an image template on the display for determining a position of a target object in an image to be captured using the device;
      capturing a first image of the target object using the image sensor and displaying the captured first image on the display while keeping the image template on the display;
      extracting one or more features associated with the position of the target object from the captured first image;
      determining whether the one or more features extracted from the captured first image associated with the position of the target object from the captured first image match the one or more parameters of the image template; and
      generating an alert signal in accordance with a determination that at least one of the one or more features extracted from the captured first image matches the image template.

10. The device of claim 9, wherein the one or more programs further comprises instructions for:
   in accordance with a determination that any of the one or more features extracted from the captured first image does not match the image template, capturing a second image distinct from the first image of the target object using the image sensor, and while keeping the image template on the display, displaying the second image on the display.

11. A non-transitory computer readable storage medium storing one or more programs, the one or more programs comprising instructions, which, when executed by a server system with one or more processors, cause the server system to perform operations comprising:

storing a plurality of reference images in the memory;

generating image templates from the plurality of reference images, each image template including one or more parameters extracted from the plurality of reference images, wherein the one or more parameters are associated with positions of one or more objects included in each of the plurality of reference images and include a contour of the one or more objects;

rendering, from the image templates, an image template on the display for determining a position of a target object in an image to be captured using the device;

capturing a first image of the target object using the image sensor and displaying the captured first image on the display while keeping the image template on the display;

extracting one or more features associated with the position of the target object from the captured first image;

determining whether the one or more features extracted from the captured first image associated with the position of the target object from the captured first image match the one or more parameters of the image template; and generating an alert signal in accordance with a determination that at least one of the one or more features extracted from the captured first image matches the image template.

\* \* \* \* \*